Oct. 29, 1968
E. S. KARSTENS
3,407,506
PRECISION PLUMB LEVEL DEVICE
Filed Sept. 30, 1966
2 Sheets-Sheet 1
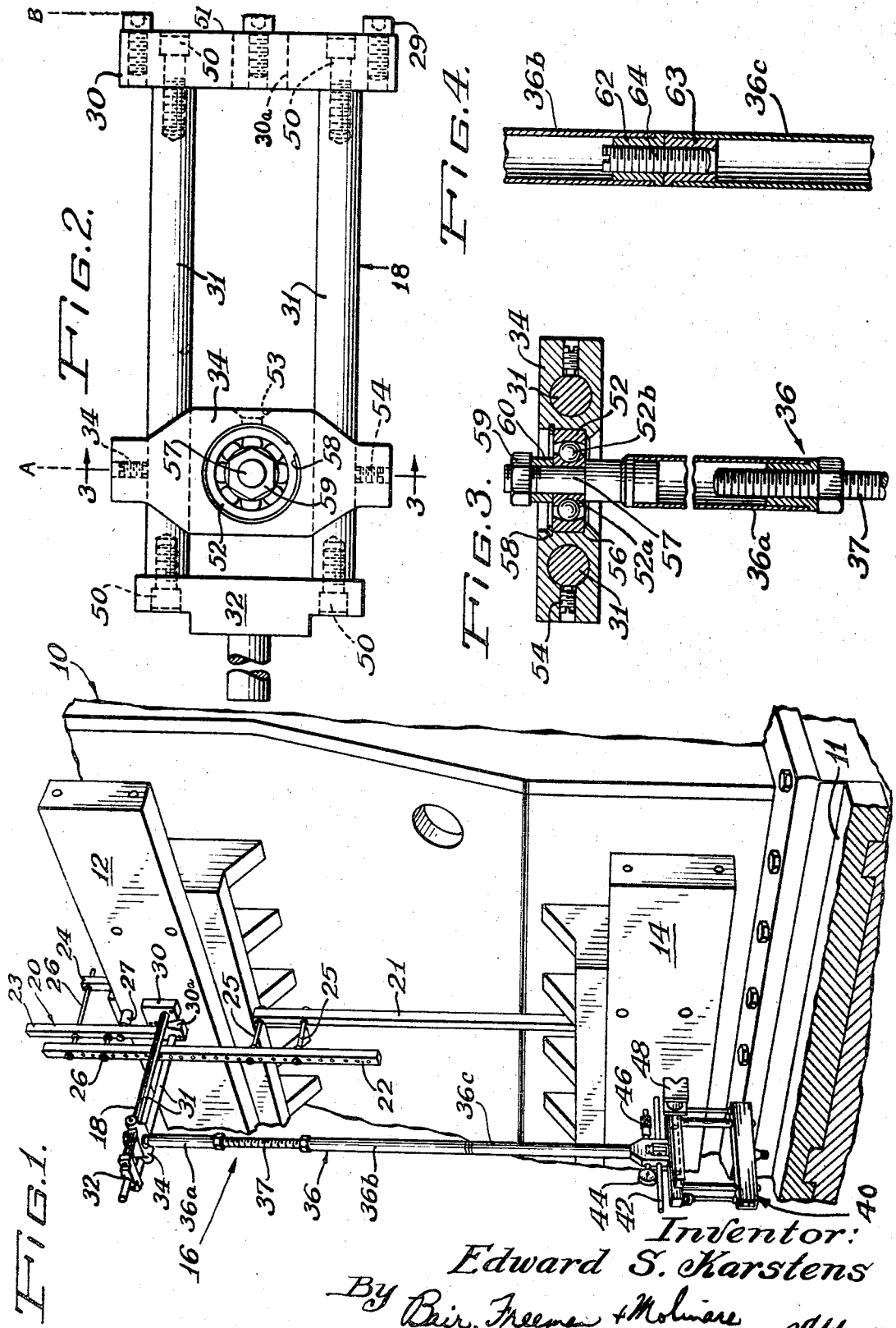
Inventor:
Edward S. Karstens
By Bair, Freeman + Molinare
Attys.

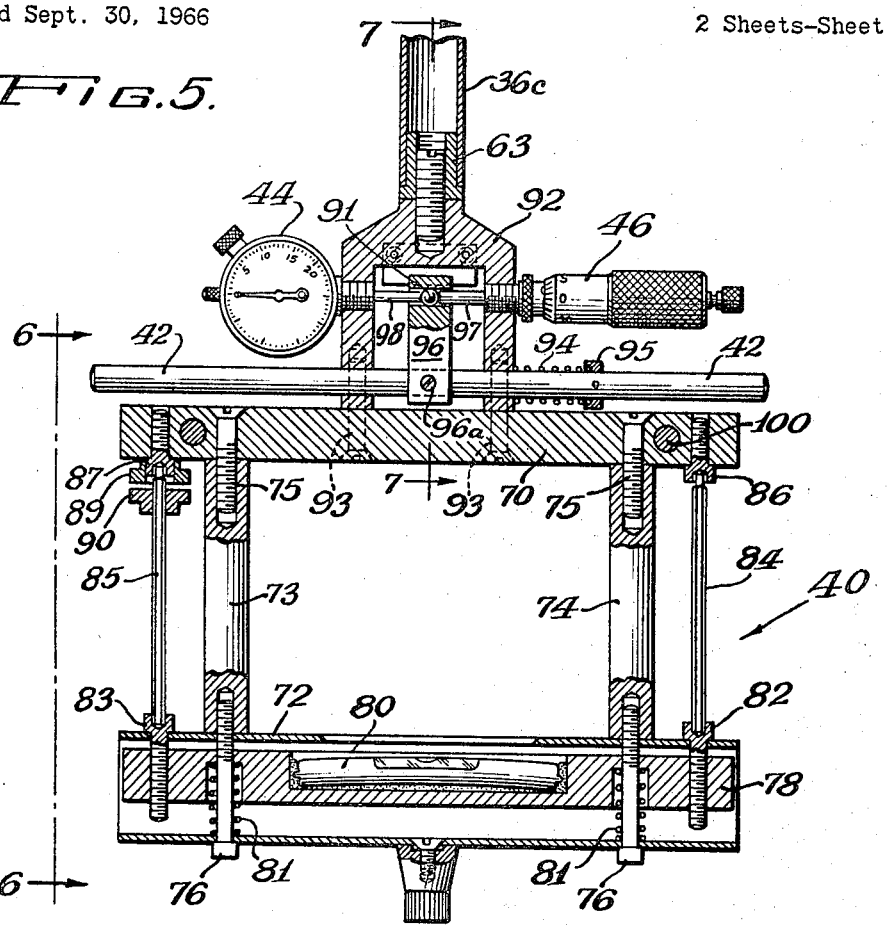
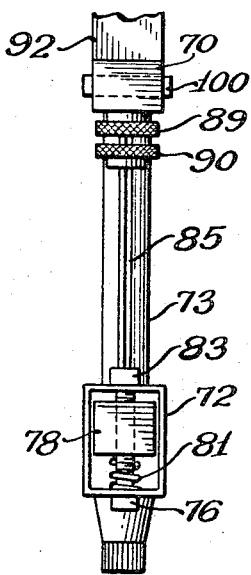
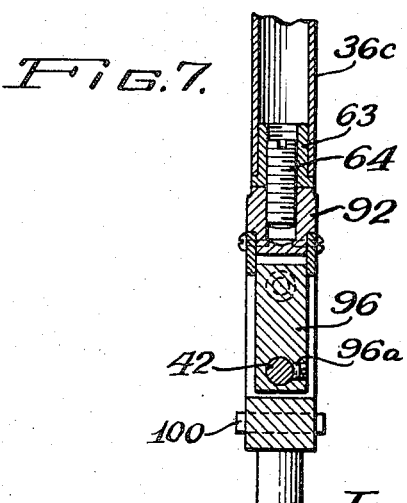

United States Patent Office 3,407,506
Patented Oct. 29, 1968

3,407,506
PRECISION PLUMB LEVEL DEVICE
Edward S. Karstens, 1228½ Sturtevant St.,
Davenport, Iowa 52804
Filed Sept. 30, 1966, Ser. No. 583,317
8 Claims. (Cl. 33—174)

ABSTRACT OF THE DISCLOSURE

A precision plumb level device comprising an upper support member, an elongated depending member secured to said upper support member by self-aligning bearing means, and a lower head assembly secured to said elongated depending member. The lower head assembly includes a support member, an elongated extension rod on the support member for abutting an upright surface, adjustable level means for indicating when the extension rod is level, indicator means for determining the position of the extension rod relative to the support member, and a graduated adjustment for moving the extension rod.

---

This invention relates to a precision plumb level device and, more particularly, to an improved plumb level device for accurately positioning generally upright surface means in a vertical plane.

In various types of heavy industry equipment for the manufacture and assembly of heavy operating machinery, as for example, a Millstand in a rolling mill or a skin mill for machining wings for airplanes, it is necessary to orient guide surfaces, which are either in a common plane or in parallel offset planes, in a vertical plane or planes at right angles to a work surface.

Among devices that have heretofore been used for "squaring-up" or accurately orienting planar guideway or rail at right angles to a horizontally disposed work surface are optical tooling, granite blocks, and plumb lines.

The optical arrangements were quite complex and costly and were generally not capable of producing precision alignment, on the order of 0.0005 inch.

The granite blocks had adjacent accurately machined surfaces that were flat and at right angles to one another. Such blocks were disposed on a horizontal surface and it was intended that an adjacent upright surface of the block about a vertical surface to be disposed at right angles to the horizontal surface. The vertical surface was then adjusted to bring it into abutment with the upright surface of the block. The blocks were large and cumbersome to use.

A plumb line could be hung from the top of a vertically disposed planar surface. By means of a micrometer, the distance the planar surface deviated from the plumb line could be measured and the planar surface or support for the planar surface could then be shimmed or otherwise adjusted in an attempt to position the planar surface at right angles to a horizontally disposed reference surface. The plumb line method was not very satisfactory.

An object of the present invention is to provide a novel plumb level device for orienting generally upright guide surface in a vertical plane in a convenient and expeditious manner.

Another object of the present invention is to provide an improved precision plumb level device incorporating an upper support member adapted to be supported in engagement with planar surface means, a depending rod-like member rotatably journaled in said upper support member, and a lower support member, the lower support member including extension means adadpted for engagement with planar surface means, and indicator means and graduated adjustment means on the lower support member operatively connected to the extension means, the precision plumb level device functioning to determine the amount the planar surface means deviates from a predetermined desired adjusted position with respect to a horizontal work surface in order to enable the operator to make the requisite adjustment for properly aligning the surface means in a vertical plane at right angles to the work surface. Other objects and advantages of the present invention will become more apparent hereinafter.

The specific details of a presently preferred form of the invention and their mode of functioning will be made most manifest in clear, concise and exact terms in conjunction with the accompanying drawings, wherein:

FIG. 1 is a perspective view of heavy industrial equipment having an upper guideway and a lower guideway that are adapted to be disposed at precisely right angles to a horizontal work table, and illustrating the precision plumb level device of the present invention in place on the equipment;

FIG. 2 is a top view of the upper support member of the precision plumb level device of FIG. 1;

FIG. 3 is a detail view taken generally along the line 3—3 of FIG. 2 and illustrating the connection of the depending member to the self-aligning bearing in the upper support member;

FIG. 4 is a detail view illustrating the connection between adjacent extension rod members which comprise the depending member;

FIG. 5 is a cross-sectional view of the lower support member of the precision plumb level device of the present invention, taken generally in a vertical plane through the support member;

FIG. 6 is a side view of the lower support member taken generally along the line 6—6 of FIG. 5; and FIG. 7 is a cross-sectional detail view of a portion of the lower support member taken generally along the line 7—7 of FIG. 5.

Referring now to FIG. 1 there is illustrated a perspective view of heavy industrial equipment designated generally by the numeral 10. The equipment illustrated is a skin mill made by Kearney & Trecker Co. of Milwaukee, Wis., which has an upper planar guideway 12 and a lower planar guideway 14 that are adapted to be positioned at right angles to the surface of the work table 11. The guideways or rails 12 and 14 which are adapted to support metal working tools thereon are suitably secured to appropriate brackets secured to the frame of equipment 10. The work table is disposed in a horizontal plane with respect to a reference surface. The planar surfaces of rails 12 and 14 are in parallel planes and are adapted to be disposed at right angles to the top surface of the work table to assure accuracy during machining of an article supported on the work table by the tools supported from the rails. The precision plumb level mechanism of the present invention is designated generally by the numeral 16. The precision plumb level device 16 includes an upper support member 18 that is adapted to be supported at right angles to the machined planar surface of the guideway 12 by means of auxiliary bracket means 20. The auxiliary bracket is adapted to accommodate the offset between the planes of the machined surfaces of the guideways 12 and 14, and may include elongated brace members 21, 22, 23 and 24 suitably joined to one another by means of connecting bolts 25 and 26. The members 21 and 22 may be joined by the connecting members or bolts 25 and the upper ends of the connecting members 22 and 23 are joined to one another and to the member 24 by means of the bolts 26. Spacer 27 is affixed to the member 23 and disposed between the member 23 and the face of the guideway 12 for rigidifying the connection between the auxiliary support bracket 20 and the head 30 of the plumb level device 16. A thumb screw (not shown) is secured in a tapped opening adjacent the lower end of member 23 for engaging with base 30 just above recess 30a. Upper support member 18 includes a head or base 30 having a planar surface adapted to be secured to the machined surface of guideway 12. The base 30 is provided with three triangularly-disposed feet or projections 29 that engage with the machined surface of the guideway 12 in a stable manner. Rods 31 extend from the base at right angles and are retained at the ends opposite from the base 30 in spaced-apart relationship by means of a cross brace or bracket 32. Secured to the rods 31 adjacent the bracket 32 is bearing retainer 34 which contains a self-aligning bearing for supporting a depending member 36 universally from the upper support member 18. Preferably, the depending member 36 is comprised of a plurality of tubular members 36a, 36b and 36c detachably secured to one another. As shown, the member 36 includes an adjustable link member 37 between the uppermost member 36a and the member 36b for providing for minor adjustment in the length of the depending member. If substantial increase or decrease in length is desired then another member 36b may be added or a member 36b may be removed from the depending member 36.

Secured to the lower end of the section 36c of the depending member 36 is a lower support member or head assembly 40 which carries thereon for movement transversely of the axis of member 36 an extensible rod 42 that is adapted to extend from either end of the support member 40. The head assembly also includes indicator means 44 operatively connected to the extension rod and graduated adjustment means operatively joined to the extension means for moving the extension means relative to the support member.

Referring now to FIGS. 2 and 3, there is illustrated in further detail the upper support member 18. In a preferred embodiment of the invention, the rods 31 are secured to the base 30 and the cross brace 32 by means of cap screws 50. The recesses in the base 30 for reciving the cap screws are counterbored so as to provide a flush surface 51. The feet 29 extending from the base 30 provide a stabilized support with respect to the front surface of rail 16. The retainer 34 for the self-aligning bearing 52 is held in place on the rods 31 by means of set screws 54.

The bearing retainer 34 is provided with a recess 53 in the side thereof facing the base. The recess is sized to receive one end of an inside micrometer. The micrometer is adapted to engage in the recess 53 at one end and the other end of the micrometer is adapted to abut the front surface of rail 12 in the recessed portion 30a of base 30 for accurately locating the bearing retainer with respect to rail 12, that is, for precisely spacing a transverse plane through the center line of bearing 52 from the front surface of rail 12. In one form of the invention, distance between lines A and B (FIG. 2) is five inches including ½ outside diameter (O.D.) of bearing 52. If the O.D. of bearing is two inches, set micrometer at four inches to space center of bearing five inches from face of rail 12.

Referring to FIG. 3, it is seen that the outer race of the self-aligning bearing 52 abuts at its lower end against an annular shoulder 56 within the bearing retainer 34 and is secured in place by means of a snap ring or retaining ring 58. The upper end of the depending member 36 may include a reduced portion 57 that extends through an opening in the inner race 52a of bearing 52 and is threaded adjacent the end thereof. Member 36 is affixed to the bearing 52 by means including a nut 59 and a spacer 60. Thus it will be apparent that the depending member 36 is secured to the inner race 52a of the self-aligning bearing 52 and is movable universally with respect to the upper support member 18, that is, the member 36 can rotate about its axis or it can pivot about a generally horizonal axis through the bearing 52 with a pendulum-type motion.

In FIG. 4 there is shown one method of joining adjacent sections of member 36. An insert member 62 may be secured in the end of each tubular member 36b and a similar insert 63 may be disposed in an abutting end of the tubular member 36c. A connecting member, which may take the form of a threaded screw 64 may be provided in the opening extending through the inserts 62 and 63 for securing the inserts in abutting face-to-face relationship and thereby joining the members 36b and 36c to one another. One end of the connecting member 64 may be provided with a slot for receiving a screw driver or like implement to effect rotation of the connecting member and thereby permit connection and disassembly of a pair of adjacent members 36b and 36c.

Referring now to FIGS. 5-7 there is illustrated the construction of the head assembly 40. The lower support member or head assembly 40 comprises frame means including an upper bar 70 and a lower member 72 joined to one another by means of upright members 73 and 74. Suitable fastening means, as for example, screws 75 are provided for securing the upper bar 70 to the upright members 73 and 74 respectively. Fastening means, which may comprise elongated screws 76, join the lower member 72 to the upright members 73 and 74.

Carried within the tubular lower support member 72 is a level indicator mechanism which includes a bar 78 that has secured thereto a bubble level indicator 80. The bar 78 has openings therein through which the fastening means 76 extend so as to permit relative movement between the bar 78 and fastening means 76. Bar 78 is biased upwardly by means of coil springs 81 disposed concentrically about screws 76. At one end the bar 78 is threadedly connected to a screw member 82 which extends through an opening in the top of member 72. The screw member 82 has a noncircular recess in the head for receiving a noncircular end of rod 84 so as to be rotatable therewith. The upper end of rod 84 is journaled in a recess in screw member 86 that is rotatably secured within a bore in the upper bar 70. The other end of the bar 78 is secured to a screw 83 similar to the screw 82. Screw 83 extends through an opening in the top of member 72. The upright rod 85 is journaled at its upper end in a recessed head in screw 87 that is in turn rotatably secured to the upper bar 70. An adjustment nut 89 is affixed to the head of the screw 87. An adjustment nut 90 is joined to the rod 85 adjacent the upper end thereof.

Initially, the bar 78 is positioned centrally within tubular member 72 by appropriate adjustment of screws 86 and 87, rods 84 and 85, and screws 82 and 83. In later use, further adjustment of the effective length of members 82, 84 and 86 would not be needed.

Nuts 89 and 90 function to provide a differential screw adjustment for moving bar 78 to center the bubble within vial 80. Screw 83 is provided with a greater number of threads per inch than screw 87. For example, screw 83 may have 32 threads per inch and screw 87 may have 28 treads per inch. For rough adjustment, nut 90 is rotated to turn rod 85 and screw 83. For fine adjustment, both nuts 89 and 90 are rotated, causing both screws 83 and 87 to rotate. The screws rotate in the same direction, and the threads thereof act as a differential thread to effect a relatively small amount of vertical movement of the associated end of bar 78. Movement of the left end of bar 78 (FIG. 5) will permit centering of the bubble in the vial 80.

The recessed space within bar 78 is also adapted to accommodate an electronic level mechanism which may be used with or in place of the spirit level vial or bubble level mechanism illustrated.

The frame means of the lower head assembly 40 also includes a U-shaped member 92 that is secured to the upper frame bar 70 by means of suitable connecting means 93. The extension bar 42 extends through openings in the legs of the U-shaped member 92 and is journaled therein for reciprocable sliding motion generally at right angles to the axis of the depending member 36. Spring means 94 are disposed about the extension member 42 between one leg of the U-shaped member 92 and a stop member 95 carried on the extension rod 42 for biasing the rod toward the right as viewed in FIG. 5.

The frame means of head assembly is preferably fabricated from aluminum. In such event steel plugs 100 are secured to the bar 70 as shown. The steel plugs 100 are adapted to cooperate with the magnetic guide 48 to properly position the lower head assembly at right angles with respect to rail 14.

A projection or lug member 96 is carried on the extension rod 42 and extends upwardly therefrom in the area between the legs of the U-shaped bracket 92. Rod 42 is twice as long as the distance between lines A and B when faces of rails 12 and 14 lie in common plane. Thus if distance between lines A and B were five inches, rod 42 would be ten inches long. As shown in FIG. 1, the rails are offset eight inches, therefore, distance between lines A and B would be 13 inches. In the event of a reverse offset of rails 12 and 14, the difference would be added to the length of rod 42. A ball 91 is press fit into an opening adjacent the top of projection 96. The center line of the ball lies in a plane at right angles to extension rod 42 at the center of the rod. One side of the ball 91 is adapted to be engaged by the spindle 97 at one end of the micrometer 46 and the other side of the ball 91 opposite from the micrometer spindle engagement portion is adapted to be engaged by the spindle 98 extending from the indicator 44. Thus it will be evident that movement of the micrometer spindle 97 will move the extension rod 42 transversely of the axis of the member 36. Movement of the lug portion 96 by the spindle 97 of the micrometer 46 will cause a corresponding movement of spindle 98 and provide a new reading on the indicator means 44. The indicator means 44 comprises a conventional dial indicator including an adjustment nut for permitting adjustment of the dial to correlate the dial and needle at zero.

The indicator means 44 and the graduated adjustment means 46 are provided with indicia that will indicate in a 2:1 ratio. That is, for a single increment of linear movement of the micrometer, the indicator on the face of the indicator means 44 will show one half the reading of the micrometer indicia. It will be appreciated that by means of this unique utilization of a 2:1 arrangement between the indicator 44 and the micrometer 46, the pendulum-type or plumb level-type of leveling device is made self-calculating.

In FIG. 7 there is shown a detail of the manner of securing the section 36c of depending member 36 to the bracket means 92 of the frame for the lower head assembly 40. The insert 63 in the lower end of the tubular member 36c of the member 36 has an opening therein that is adapted to be aligned with an opening in the top of the bracket means 92. The screw fastening means 64 is secured within the aligned openings for joining the lower end of the tubular section 36c of depending member 36 to the frame means 40.

As seen in FIG. 7, the upright projection 96 has an opening therein for securing same onto the extension rod 42. A set screw 96a is provided to effect securement of the projection 96 to the rod 42.

The operation of the precision plumb level device of this invetnion will now be considered with respect to the equipment shown in FIG. 1, though it will be understood that the device can also be used with other equipment for properly orienting vertically-disposed surface means at precisely a right angle with respect to a horizontally-disposed reference surface. In use, the upper support member 18 is suitably secured to the upper guideway or rail 12 by means of the auxiliary bracket 20. Assuming, for example, that the plane of the front face of rail 12 is offset to the rear eight inches from the plane of the front face of rail 14, the bearing retainer 34 will be adjusted to locate the center line of the bearing 52 13 inches from the front face of rail 12. A device 16 will be utilized wherein the extension rod is ten inches long.

After securing the upper support member 18 on guideway 12, the depending member 36 is secured to the self-aligning bearing 52 within the cross brace 34. The requisite number of extension sections may be added to the depending member 36 so as to bring the lower support member 40 into approximate horizontal alignment with the front surface of rail 14. A magnetic guide 48 is detachably affixed to the guideway 14 so as to prevent swinging motion of the device 16 and to retain the lower support member 40 in a plane generally at right angles to the guideway 14. The guide 48 cooperates with the steel plugs 100 secured to bar 70 of the lower head assembly 40.

The micrometer or graduated adjustment means 46 is adjusted so as to set same at a predetermined value, as for example, 0.500 inch. The scale on the indicator means is set to 0. By moving the differential adjustment screws 89 and 90, the bubble within the vial 80 carried on the bar 78 is centered.

The lower support member 40 is then rotated 180° so that the opposite end of the extension rod 42 is adapted to abut the guideway 14. The micrometer 46 is then adjusted, causing movement of the extension rod 42 with respect to the front face of guideway 14 so as to center the bubble in the vial 80 within the bar 78.

Since the indicator indicia is arranged in a 1:2 ratio with respect to the micrometer indicia, each indicia on the micrometer will read twice the indicia on the indicator for a given increment of linear movement of the micrometer spindle. For a given increment of micrometer movement, the indicator will indicate half an increment of movement. For example, if the micrometer spindle is moved linearly 0.050 inch, the indicator will read 0.025. Thus, the device of the present invention is made self-computing by use of the indicator means 44 in conjunction with the graduated adjustment means 46, and upon movement of the micrometer 46 to level the bubble in the vial 80, the indicator 44 will read the amount the weldment supporting the rails 12 and 14 has to be adjusted in order to place the front surfaces of the rails 12 and 14 in vertical planes at right angles with respect to the horizontal plane of the work table 11. Suitable wedge block means or adjustment screws may be used to effect the adjustment of the weldment supporting the rails 12 and 14.

By rotating the lower support member 40 180°, the adjustment can be verified. Thus if the bubble within the level vial 80 remains centered when the lower support member 40 is rotated to its initial starting position, then the operator will know that the front surfaces of the rails 12 and 14 are disposed in vertical planes at right angles with respect to the horizontal plane of the work table 11.

In the absence of the indicator having indicia arranged to read in a 1:2 ratio with respect to the micrometer indicia, it would be necessary to initially adjust the micrometer to 0.500 inch and then level the vial. After 180° rotation or inversion of the ends of the lower head assembly, the micrometer would be adjusted to level the vial. The new micrometer reading, for example 0.550 inch, would be added to the base reading (0.500 inch) and the sum 1.050 inch would be divided by two, resulting in a mean reading of 0.525 inch. The user would then know that it was necessary to adjust the vertical surface support or weldment .025 inch to position the front surfaces of rails 12 and 14 at right angles to a horizontal reference surface. After shimming the vertical surface support or weldment, the micrometer would be set to 0.525 inch for verifying the adjustment, and if the adjustment were proper, the vial or indicator means will indicate level.

The present invention provides a precision plumb level device which is relatively simple in construction and operation and provides for highly accurate readings so as to be capable of utilization in equipment where high precision is necessary. In the preferred embodiment of the invention shown in the present application, the device is made self-calibrating by means of the corroboration between the micrometer adjustment means and the indicator means.

Having described my invention, I claim:

1. A precision plumb level device for testing vertical disposition of a surface means including upper and lower places disposed in a common plane or in offset parallel planes, said device comprising an upper support member adapted to be secured at right angles at said upper place on said surface means, self-aligning bearing means carried by said support member, an elongated depending member secured at its upper end to the bearing means and being supported for rotation about its axis in the bearing means, a lower support member secured to the lower end of the depending member, elongated extension means on the lower support member adapted to engage with with said lower place on said surface means, adjustable level means for indicating when the extension means is level, indicator means operatively joined to the extension means for determining the position of the extension means relative to said lower support member, and graduated adjustment means operatively joined to the extension means for moving the extension means relative to the lower support member.

2. A precision plumb level device as in claim 1 wherein the extension means comprises a rod-like member adapted to extend from opposite sides of the lower support member, the extension means being reciprocably carried on the lower support member.

3. A precision plumb level device as in claim 2 wherein a projection extends at right angles from the rod-like member, said indicator means engaging said projection on one side thereof and said adjustment means engaging the projection on an opposite side thereof, said projection being biased into engagement with said adjustment means.

4. A precision plumb level device as in claim 1 wherein the adjustment means is graduated in a two to one ratio with respect to the indicator means so that the adjustment means will read twice the indicator means for a given predetermined linear movement of the extension means.

5. A precision plumb level device as in claim 4 wherein the adjustment means comprises a micrometer including a spindle and the extension means comprises an elongated rod-like member extending from opposite ends of the lower support member and a projection secured centrally of the rod-like member, the projection being adapted to be biased into engagement with the micrometer spindle to assure conjoint movement of the rod-like member with the micrometer spindle.

6. A precision plumb level device as in claim 5 wherein the indicator means includes a spindle, the indicator means spindle and the micrometer spindle being carried for movement coaxially on the lower support means, the spindles abutting opposed surfaces on the projection on the rod-like member.

7. A method of testing the vertical disposition of a surface means including upper and lower places disposed in a common plane or in offset parallel planes utilizing plumb level mechanism comprising upper support means, a depending member universally joined to the upper support means and a lower head assembly secured adjacent the lower end of the depending member, said lower head assembly including adjustable level means, elongated extension means slidably supported on the lower head assembly, indicator means and graduated adjustment means operatively connected to the extension means for moving same, the graduated adjustment means and the indicator means having indicia arranged in a two to one ratio such that for said given linear movement of the graduated adjustment means, the indicia on the adjustmeant means will read twice the indicia on the indicator means, said method comprising the steps of affixing the upper support means at right angles to said upper place on said surface means, positioning the lower head assembly such that one end of the extension means abuts said lower place on the surface means, setting the graduated adjustment means and the indicator means to a zero position, adjusting the level means until it indicates level, rotating the lower head assembly 180 degrees to position the other end of the extension means in abutment with said lower place on the surface means and indicating variation from vertical disposition directly, and adjusting the graduated adjustment means until the level means indicates level.

8. The method of claim 7 including the steps of adjusting the surface means by an amount indicated by the reading of the indicator means and rotating the lower head assembly 180 degrees to reposition said one end of the extension means in abutment with said vertical surface means and noting whether the level means indicates level.

References Cited

UNITED STATES PATENTS

| | | | |
|---|---|---|---|
| 2,402,888 | 6/1946 | Hall | 33—180 |
| 3,122,840 | 3/1964 | Karstens | 33—207 |

SAMUEL S. MATTHEWS, *Primary Examiner.*